United States Patent [19]

Fortsch

[11] Patent Number: 5,317,787
[45] Date of Patent: Jun. 7, 1994

[54] CABLE TIE HAVING IMPROVED TAIL GRIPPING AND HOLDING FEATURE

[75] Inventor: William A. Fortsch, Bernardsville, N.J.

[73] Assignee: Thomas & Betts Corp., Memphis, Tenn.

[21] Appl. No.: 955,558

[22] Filed: Oct. 1, 1992

[51] Int. Cl.$^5$ ............................................. B65D 63/00
[52] U.S. Cl. ............................ 24/16 PB; 24/17 AP; 24/30.5 P
[58] Field of Search .............. 24/16 PB, 16 R, 17 AP, 24/30.5 P; 248/74.3; 292/321, 322

[56] References Cited

U.S. PATENT DOCUMENTS

| | | | |
|---|---|---|---|
| 2,977,145 | 3/1961 | Rifkin | 292/322 |
| 4,191,334 | 3/1980 | Bulanda et al. | 24/16 PB |
| 4,263,697 | 4/1981 | Speedie | 24/16 PB |
| 4,272,870 | 6/1981 | McCormick | 24/16 PB |
| 4,506,415 | 3/1985 | Swift | 24/16 PB |
| 4,658,478 | 4/1987 | Paradis | 24/16 PB |
| 4,860,979 | 8/1989 | Camenisch | 248/74.3 |
| 5,154,376 | 10/1992 | Baum et al. | 248/74.3 |

Primary Examiner—Victor N. Sakran
Attorney, Agent, or Firm—Robert M. Rodrick

[57] ABSTRACT

A bundling tie for looping about plural articles includes a head, a tail and elongate strap body therebetween. The head and the strap body include cooperative locking means for securing the strap in the head of the bundling tie. The tail of the bundling tie includes outwardly projecting tactile elements for enhancing the gripability of the tail to facilitate pulling the strap body through the head of the bundling tie. The head and the tail also permit the removable holding of the tail in the head of the bundling tie prior to locking engagement of the strap body with the head.

6 Claims, 2 Drawing Sheets

CABLE TIE HAVING IMPROVED TAIL GRIPPING AND HOLDING FEATURE

FIELD OF INVENTION

The present invention relates generally to bundling ties for securing a group of articles More particularly, the present invention relates to a cable tie having an improved tail design which permits the tail to be more easily gripped and permits temporary retention of the tail in the head of the cable tie.

BACKGROUND OF THE INVENTION

Cable ties have long been used to bundle a variety of objects such as electrical wires or cable. Early examples of such cable ties are shown in U.S. Pat. Nos. 3,186,047 and 3,486,201. Each of these cable ties includes an elongate member having a head at one end, a tail at the other and a longitudinal strap body therebetween. The cable tie is used by wrapping the tie around a bundle of articles and inserting the tail through the head. The head and the body include cooperative locking elements so that when the tail is pulled tightly through the head, the locking elements secure the strap body in the head.

Cable ties come in various shapes and sizes. Often, multiple small cable ties are employed at spaced locations longitudinally along the bundle of wires. Use in this manner presents two distinct problems.

First, given the small size of the cable tie, it is difficult to grasp the tail and to securely pull it through the head. There is a tendency for the tail to slip out from between the fingers of the installer making securement around the bundle difficult. Also, when multiple small cable ties are employed, it is often necessary to loosely wrap the tie around the bundle at the spaced locations and then, in sequence, tighten each cable tie around the bundle. When using small cable ties, there is a tendency for the tail to "pop out" of the head prior to locking engagement therewith. When this occurs, it is necessary to rethread the tail through the head and possibly realign the cable ties which may have shifted prior to securement.

It is desirable to provide a cable tie having a tail which may be easily, manually grasped to facilitate pulling the tail through the head. It is also desirable to provide a cable tie where the tail may be removably held in the head prior to locking engagement of the strap with the head.

SUMMARY OF THE INVENTION

It is an object of the present invention to provide a bundling tie for wrapping around articles where the tail of the tie may be held in the head prior to locking engagement therewith.

It is a further object of the present invention to provide an bundling tie having a tail with improved gripping features to permit the manual grasping of the tail for pulling it through the head of the bundling tie.

In the efficient attainment of these and other objects, the present invention provides a bundling tie for wrapping around articles. The tie comprises an elongate member having a head at one end, a tail at the other end and a central strap body therebetween. The head includes a passage therethrough for receipt of the tail. The head and the body include cooperative locking means for locking the body in the head passage. The head and the tail also include cooperative holding means for removably holding the tail in the head passage.

Specifically shown by way of the preferred embodiment herein, the tail of the bundling tie further includes improved outwardly projecting tactile elements which enhance the gripability of the tail to facilitate pulling the tail through the head.

Figure 1:
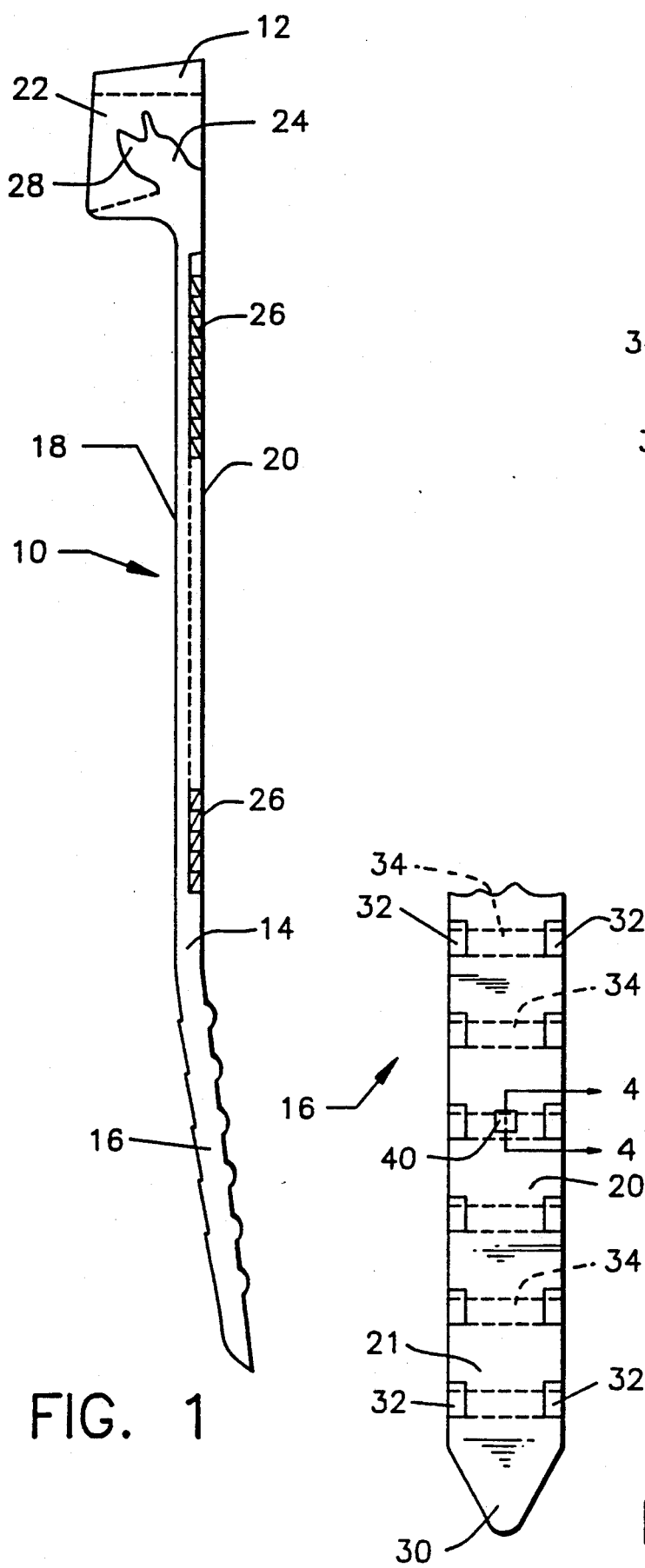
FIG. 1 is a side plan view of an improved cable tie of the present invention.

DETAILED DESCRIPTION OF THE PREFERRED EMBODIMENT:

Referring to FIG. 1, a cable tie 10 of the present invention is shown. Cable tie 10 is typically an elongate molded plastic member which is used in a manner which is well known in the art, to wrap around articles or bundles of articles such as electrical wire or cable (not shown).

Cable tie 10 has a head 12 at one end and a depending strap body 14 extending therefrom. The opposite end of strap body 14 includes a tail 16. Strap body 14 is typically planar shaped having first and second opposed surfaces 18 and 20. Head 12 of cable tie 10 includes a central passage 22 therethrough, which as will be more fully described hereinbelow, accommodates tail 16 and strap body 14 therein. The cable tie 10 shown in FIG. 1 is of the type having an integrally molded barb 24 formed in the head portion which extends into passage 22. Cable tie 10 also includes a longitudinally extending plurality of teeth 26 along surface 20 of strap body 14. Barb 24 includes one or more barb teeth 28 which engage strap teeth 26 to lock the strap body 14 into head 12 after it is coiled around a bundle of articles. The locking operation of strap body 14 with head 12 is well known in the cable tie art. Additionally, while a cable tie having an integrally molded barb 24 and a strap body 14 with strap teeth 26 is shown, the present invention may also be employed with a cable tie having an embedded metallic barb in head 12 and a smooth strap body 14.

In conventional operation, tail 16 is wrapped around a bundle of articles and inserted through the passage 22 of head 12. As the strap is pulled through the passage, strap teeth 26 engage barb teeth 28 and in a ratchet-like action, secure the strap body 14 in head 12. Tail 16 may be continually pulled to "snug-up" cable tie 10 around the bundle of articles. Interaction of the strap teeth 26 and barb teeth 28 is such that withdrawal of the strap body through head 12 is prevented.

Figure 2:
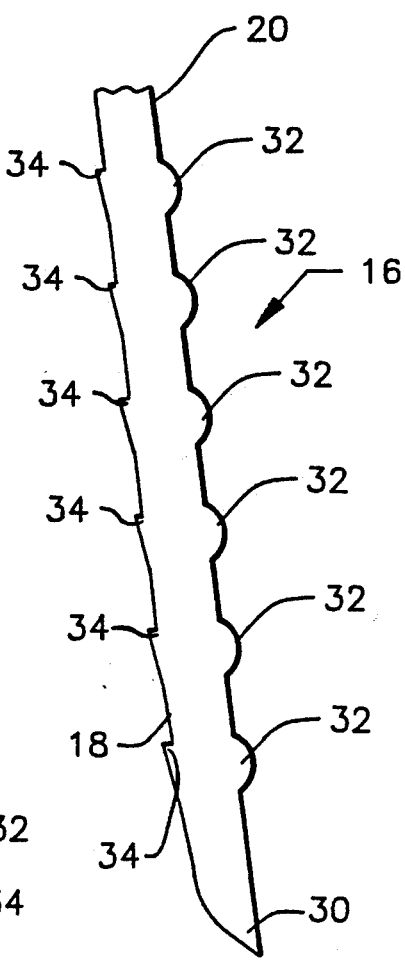
FIG. 2 is an enlarged showing of a tail portion of the cable tie of FIG. 1.
Figure 3:
FIG. 3 is a rear plan showing of the tail of the cable tie shown in FIG. 2.

Referring additionally to FIGS. 2 and 3, tail 16 of cable tie 10 is shown in more detail. The tail 16 includes a tapered, pointed end extent 30 which facilitates insertion of the tail 16 through the passage 22 of head 12. Tail 16 further includes a plurality of first tactile gripping elements 32 extending from surface 20 thereof. Gripping elements 32 are extended, rounded elements which are positioned at spaced apart locations along either longitudinal edge of surface 20. As shown in FIG. 3, first gripping elements 32 are provided in transversely spaced pairs along the length of tail 16. A central portion 21 of tail 16, between each pair of first gripping elements 32, remains flat to permit the tail to be inserted through passage 22 and over barb teeth 28. First gripping elements 32 therefore are not in interference with the barb teeth 28 as the tail 16 is being inserted through passage 22.

The raised nature of gripping elements 32 permits the tail 16 to be firmly grasped so that a superior grip is provided when the tail is being pulled through passage 22 of head 12. The non-smooth surface presented by gripping elements 32 helps to prevent slippage of tail 16 from between the fingers of the installer. This is a especially beneficial when employing small cable ties.

Additionally, surface 18 of tail 16 also includes second gripping elements 34 spaced longitudinally therealong. Second gripping elements 34 are in the shape of sharp lances which extend fully transversely across surface 18 of tail 16. As surface 18 is positioned opposite barb teeth 28 during insertion, there is no interference between second gripping elements 34 and barb teeth 28. Therefore, second gripping elements 34 may extend fully across tail 16. As shown in FIGS. 2 and 3, first gripping elements 32 are slightly rounded and extend outwardly a greater distance than second gripping elements 34. Since second gripping elements 34 must ride against the upper surface of passage 22, they are designed not to extend outwardly as far as first gripping elements 32. Thus, a sharper ridge is provided on second gripping elements 34 to facilitate secure grasping. As first gripping elements 32 extend further outwardly, they need not have as sharp a projection as the increased extension provides sufficient gripping surface. While tail 16 of the present invention may include either shaped gripping elements on either side of tail 16, it has been found that superior results and better tactile gripping is achieved by providing first rounded type gripping elements 32 on surface 20 of tail 16 and providing sharper shorter gripping elements 34 on opposed surface 18.

Figure 4:
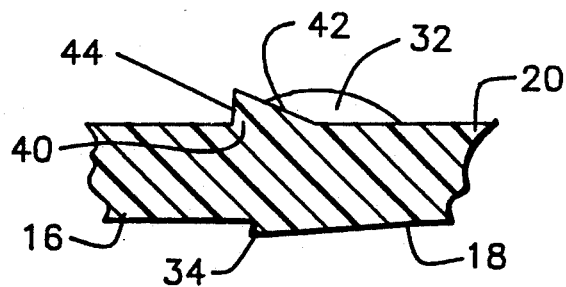
FIG. 4 is a cross-section of the tail of the cable tie taken through the lines 4—4 of FIG. 3.

Referring specifically now to FIGS. 3 and 4, tail 16 further includes a centrally disposed projection 40 extending from surface 20. Projection 40 is positioned between longitudinally extending transversely spaced first gripping elements 32 midway along central portion 21. Projection 40 is positioned so as to engage barb teeth 28 upon insertion of tail 16 into passage 22. As shown in FIG. 4, projection 40 is wedge shaped having a inclined surface 42 and an adjacent abutment surface 44. Projection 40 is designed to engage barb teeth 28 upon insertion of tail 16 through passage 22 to prevent tail 16 from inadvertently dislodging from head 12 prior to the locking engagement of strap teeth 26 with barb teeth 28.

Figure 5:
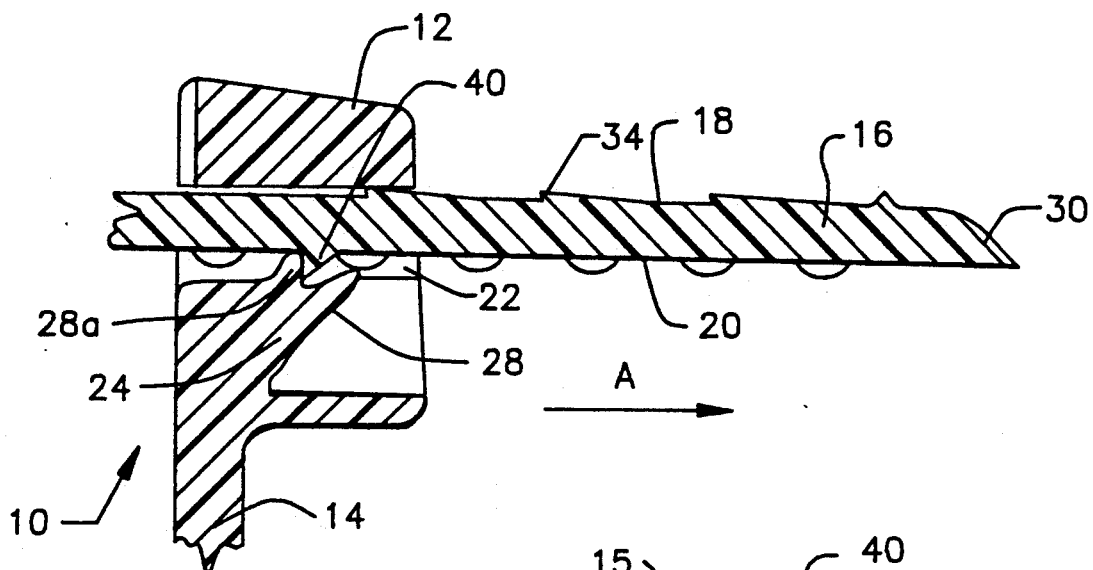
FIG. 5 shows in section, the head of the cable tie of FIG. 1 receiving the tail.

Referring to FIG. 5, it can be seen that as strap 16 is inserted into passage 22 in the direction of arrow A, inclined surface 42 of projection 40 will permit the continued insertion of tail 16 therethrough. The barb teeth 28 will easily ride over inclined surface 42 and engage abutment surface 44. Tail 16 will be prevented from inadvertently backing out of passage 22 by the engagement of raised tooth 28a of barb teeth 28 with abutment surface 44 of projection 40. Engagement of raised tooth 28a with abutment surface 40 is a relatively light securement which, if necessary, can be overcome by pulling tail 16 through aperture 22 in the direction opposite that of arrow A. This is advantageous in situations where it becomes necessary to unwrap cable tie 10 prior to locking engagement. However, the engagement of raised tooth 28a with abutment surface 44 is sufficient to prevent inadvertent backing out of tail 16 from passage 22.

Figure 6:
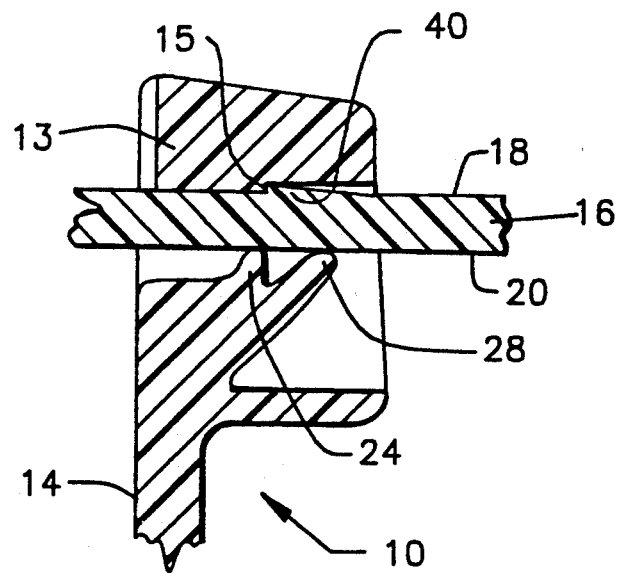
FIG. 6 shows in section, an alternative embodiment of the cable tie head and tail of the present invention.

A further technique for holding tail 16 in passage 22 of cable tie 10 is shown in FIG. 6. In this embodiment, projection 40 is formed on surface 18 of tail 16. The upper surface 13 of head 12 is formed to have a complimentary head projection 15 extending into passage 22. Thus, the engagement of projection 40 is against head projection 15 rather than barb teeth 28. As with the embodiment shown in FIG. 5, the holding engagement of tail projection 40 with head projection 15 is only sufficient to hold tail 16 in passage 22 preventing inadvertent backing out of the tail from the passage. It, however, may be overcome by manually grasping tail 16 and pulling it back through passage 22 as is the case with the embodiment shown in FIG. 5.

Various changes to the foregoing described and shown structures would now be evident to those skilled in the art. Accordingly, the particularly disclosed scope of the invention is set forth in the following claims.

I claim:

1. A bundling tie for wrapping around an article comprising:
    an elongate member having a head at one end, a tail at the other end and a central strap body therebetween;
    said head including a passage therethrough for receipt of said tail;
    said head and said body including cooperative locking means for locking said body in said head passage;
    said tail having an extending tail projection and said head having a cooperating head projection extending into said passage for engagement with said tail projection for releasably holding said tail in said passage.

2. A bundling tie of claim 1 wherein said tail further includes outwardly projecting tactile elements for enhancing manual gripping of said tail.

3. A bundling tie for wrapping around an article comprising:
    an elongate member having a head at one end, a tail at the other end and a central strap body therebetween;
    said central strap body including teeth therealong;
    said head including a passage therethrough for receipt of said tail and a locking barb extending into said passage for locking engagement with said teeth of said strap body;
    said tail having an extending projection for engagement with said locking barb for releasably holding said tail in said head passage.

4. A bundling tie of claim 3 wherein said tail includes outwardly projecting tactile elements for enhancing manual gripping of the tail.

5. A bundling tie of claim 4 wherein said tail includes a first planar surface, and wherein said tactile elements and said extending projection extend from said first planar surface of said tail.

6. A bundling tie of claim 5 wherein said tactile elements extend longitudinally in spaced apart pairs along said tail and wherein said extending projection is positioned between said spaced apart pairs.

* * * * *

REEXAMINATION CERTIFICATE (2744th)

United States Patent [19]
Fortsch

[11] B1 5,317,787

[45] Certificate Issued Nov. 28, 1995

[54] CABLE TIE HAVING IMPROVED TAIL GRIPPING AND HOLDING FEATURE

[75] Inventor: William A. Fortsch, Bernardsville, N.J.

[73] Assignee: Thomas & Betts Corporation, Bridgewater, N.J.

Reexamination Request:
No. 90/003,641, Nov. 18, 1994

Reexamination Certificate for:
Patent No.: 5,317,787
Issued: Jun. 7, 1994
Appl. No.: 955,558
Filed: Oct. 1, 1992

[51] Int. Cl.⁶ .................................................. B65D 63/00
[52] U.S. Cl. .................... 24/16 PB; 24/17 AP; 24/30.5 P

[56] References Cited

U.S. PATENT DOCUMENTS 3,717,906  2/1973  Wells .............................. 24/16
3,965,538  6/1976  Caveney et al. .................. 24/16
4,532,679  8/1985  Scott ............................... 24/16

*Primary Examiner*—Victor N. Sakran

[57] ABSTRACT

A bundling tie for looping about plural articles includes a head, a tail and elongate strap body therebetween. The head and the strap body include cooperative locking means for securing the strap in the head of the bundling tie. The tail of the bundling tie includes outwardly projectng tactile elements for enhancing the gripability of the tail to facilitate pulling the strap body through the head of the bundling tie. The head and the tail also permit the removable holding of the tail in the head of the bundling tie prior to locking engagement of the strap body with the head.

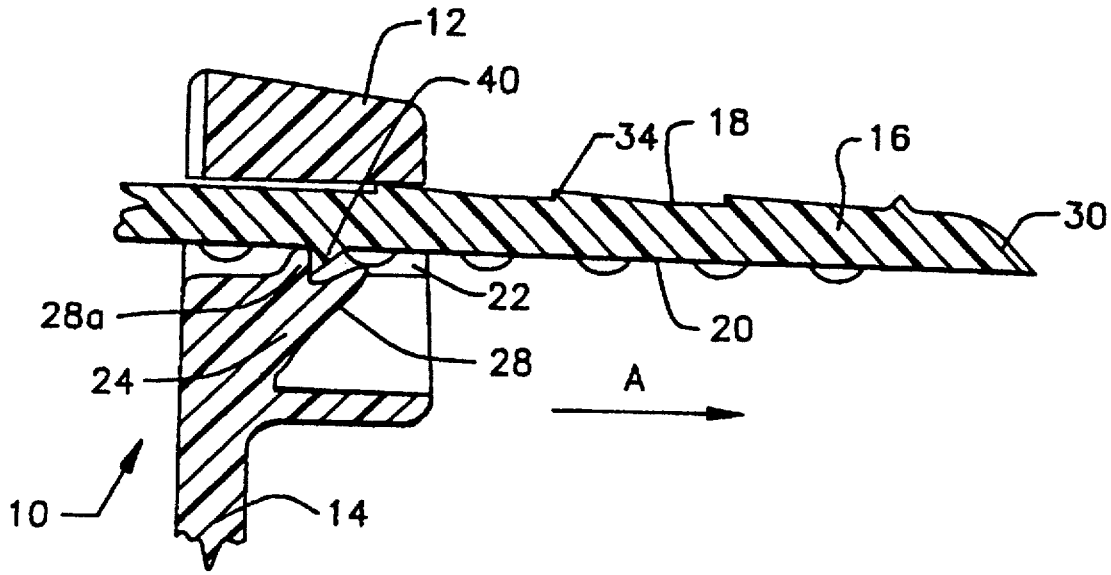

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2 and 4 are cancelled.

Claims 3 and 5 are determined to be patentable as amended.

Claim 6, dependent on an amended claim, is determined to be patentable.

New claims 7–12 are added and determined to be patentable.

3. A bundling tie for wrapping around an article comprising:
   an elongate member having a head at one end, a tail at the other end and a central strap body therebetween;
   said central strap body including teeth therealong;
   said head including a passage therethrough for receipt of said tail and a locking barb extending into said passage for locking engagement with said teeth of said strap body;
   said tail having an extending projection for engagement with said locking barb for releasably holding said tail in said head passage, *said tail including outwardly projecting tactile elements for enhancing manual gripping of the tail, said tactile elements being separate and distinct from said extending projection and of configuration and disposition on said tail to not engage said locking barb during receipt of said tail into said passage*, said projection being configured to enable disengagement from said locking barb and withdrawal from said head upon application of a force to said tail in a direction opposite its insertion into said passage.

5. A bundling tie of claim [4] *3* wherein said tail includes a first planar surface, and wherein said tactile elements and said extending projection extend from said first planar surface of said tail.

*7. A bundling tie of claim 3, wherein said projection is located on said first planar surface at a position longitudinally spaced from said teeth.*

*8. A bundling tie of claim 3, wherein said projection and said locking barb are complementarily configured to be in relatively light securement which is overcome upon application of said force.*

*9. A bundling tie of claim 5, wherein said projection is of configuration different from the configuration of said strap body teeth.*

*10. A bundling tie of claim 6, wherein each of said tactile elements comprises a rounded surface.*

*11. A bundling tie of claim 6, wherein said tail includes a second planar surface, opposite said first planar surface, and wherein a plurality of spaced tactile elements extend outwardly from said second planar surface.*

*12. A bundling tie for wrapping around an article comprising:*

*an elongate member having a head at one end, a tail a the other end and a central strap body there between;*

*said cental strap body including teeth therealong;*

*said head including a pasage therethrough for receipt of said tail and a locking barb extending into said passage for locking engagement with said teeth of said strap body;*

*said tail having an extending projection for engagement with said locking barb for releasably holding said tail in said head passage, said tail including outwardly projecting tactile elements for enhancing manual gripping of the tail, said tactile elements being separate and distinct from said extending projection and of configuration and disposition on said tail to not engage said locking barb during receipt of said tail into said passage, said extending projection configuration comprising an inclined surface for slidable engagement over said locking barb and an abutment surface for relatively light securement with said locking barb to permit withdrawal from said head upon application of a force to said tail in a direction opposite its insertion into said passage.*

* * * * *